(No Model.)
W. H. J. GOODWIN.
COTTON CHOPPER.
No. 517,570. Patented Apr. 3, 1894.
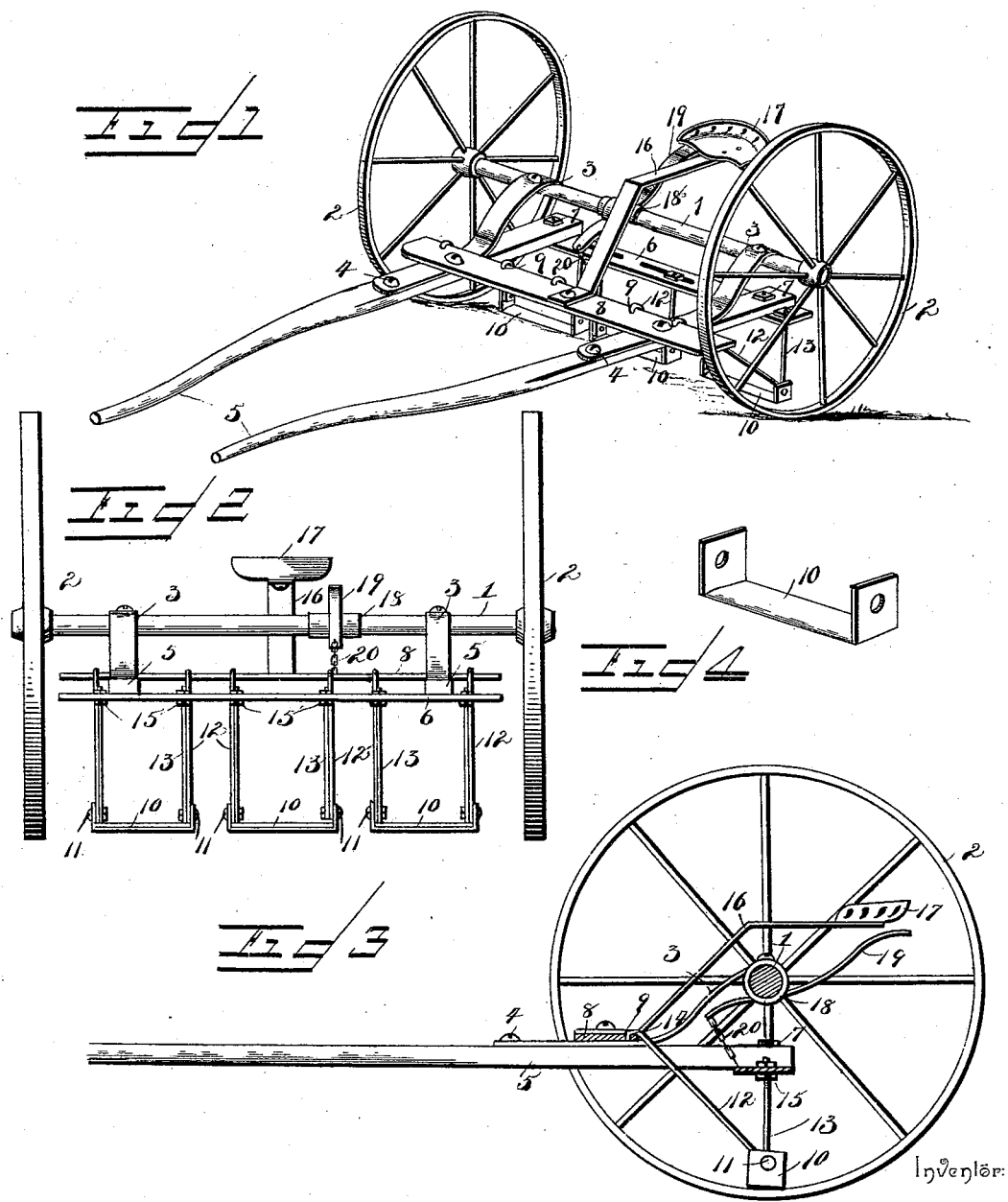
Witnesses:
W. E. Schneider
W. S. Duvall
Inventor:
William H. J. Goodwin.
By his Attorneys,
C. A. Snow & Co.
THE NATIONAL LITHOGRAPHING COMPANY,
WASHINGTON, D. C.

UNITED STATES PATENT OFFICE.

WILLIAM H. J. GOODWIN, OF RALEIGH, NORTH CAROLINA.

COTTON-CHOPPER.

SPECIFICATION forming part of Letters Patent No. 517,570, dated April 3, 1894.

Application filed June 27, 1893. Serial No. 478,974. (No model.)

*To all whom it may concern:*

Be it known that I, WILLIAM H. J. GOODWIN, a citizen of the United States, residing at Raleigh, in the county of Wake and State of North Carolina, have invented a new and useful Cotton-Chopper, of which the following is a specification.

My invention relates to cotton choppers, and has special reference to certain improvements in that class thereof carrying a series of hoes spaced apart and designed to be drawn across rows and thus thin the same, bringing the plants to a stand.

The objects in view are furthermore to so construct the chopper as to permit of its hoes being readily elevated by the driver in order that they may pass obstructions lying in their path and when released by him will be evenly pressed to their work; to provide for a ready adjustment or spacing apart of the hoes and furthermore and finally, for a vertical adjustment of the hoes.

With these main objects in view, the invention consists in certain features of construction hereinafter specified and particularly pointed out in the claims.

Referring to the drawings:—Figure 1 is a perspective view of a cotton chopper embodying my invention. Fig. 2 is a rear elevation thereof. Fig. 3 is a transverse vertical sectional view. Fig. 4 is a detail in perspective of one of the hoes.

Like numerals of reference indicate like parts in all the figures of the drawings.

In my invention I employ a transverse axle 1, whose ends terminate in the usual spindles for receiving for rotation the ground wheels 2. Adjacent to each of the ground wheels there is rigidly bolted or otherwise secured to said axle a downwardly and forwardly disposed curved flat spring 3, and the same have their lower ends securely bolted at 4, to a pair of thills or shafts 5. The shafts extend rearwardly to points under the axle and overlie a transverse beam 6, which beam is slotted at intervals and bolts passed through convenient points of the end slots of the series and through the ends of the shafts or thills, as indicated at 7. A cross-bar 8 surmounts the springs 3, and the thills, the ends of the cross-bar projecting there-beyond. This cross-bar is at intervals provided with pairs of perforations 9, and the rear bolts 4, serve to connect the cross-bar rigidly with the springs and the thills or shafts. Below the beam 6, a series of, in this instance, three substantially U-shaped hoes 10 are located, the same being in direct transverse alignment and having their upturned ends or terminals perforated. Bolts 11, are located in each of the perforations and said bolts pass through eyes formed in the lower ends of front and rear pairs of suspension rods, designated, as 12 and 13, respectively. The front rods 12 terminate in hooks 14 whose upper extremities engage with the pairs of perforations 9 with which the cross-bar 8, is provided. The rear rods 13 are threaded and take in the elongated slots with which the bar 6 is provided, and are provided above and below the bar with clamping nuts 15. It will be obvious that the hoes may be raised and lowered and secured at any point of adjustment through the medium of the nuts clamping upon the bar 6 or they may be separated more or less so as to form thicker stands, their threaded rods moving in the slots and being readily adjustable. A seat standard 16 is securely bolted to and rises from the cross-bar 8 and extends to the rear and over the axle 1, in rear of which a seat 17 for the accommodation of the driver is supported. Between two bearing collars 18 located upon the axle at one side of and adjacent to the seat standard there is fulcrumed a lever 19, the same at its front end being connected by a chain 20 with the bar 6. This completes the construction of the chopper and the operation may be briefly described as follows: The machine it will be understood is dragged across the series of cotton-rows, and the hoes thin out or cut away the plants that lie in their paths, the said hoes being pressed to their work by the flat springs augmented in their strength by the weight of the driver. If at any time the machine should come across any root, stump of a tree, stone or other obstacle dangerous thereto, it may be avoided without turning the machine out of its path, by the driver placing his foot upon the lever at the side and depressing the rear end thereof, in which case the hoes, the rear ends of the shafts and the bar 6, will be elevated against the tension of the springs and thus the machine be enabled to pass thereover without injury. The result of the machine is, as is well-known, to bring the cotton to a stand, and by its use one avoids the necessity of hand hoeing or chopping, and the work designed to be accomplished is facilitated and effected with but slight labor and expense.

Having described my invention, what I claim is—

1. In a cotton chopper the combination with an axle and opposite ground wheels, of a subjacent bar, hoes depending therefrom, thills terminating below the axle and connected to the bar and springs interposed between the axles and bar, substantially as specified.

2. In a cotton chopper, the combination with an axle its ground wheels and a subjacent bar provided with hoes, of thills terminating below the axle and connected to the bar springs interposed between the axle and bar, and means for raising the bar and its hoes against the tension of the springs, substantially as specified.

3. In a cotton chopper, the combination with an axle and its ground wheels, of a subjacent hoe carrying bar, thills terminating below the axle and connected to the bar, curved flat springs secured to and extending forwardly and downwardly from the axle, and connected to the thills in advance of the bar, substantially as specified.

4. In a cotton chopper, the combination with the axle the ground wheels, the curved springs secured to and extending forwardly and downwardly from the axle, the opposite thills bolted to the springs and extending in rear thereof to points below the axle, the perforated bar arranged over the springs and thills, the standard rising from the perforated bar and supporting the driver's seat above and in rear of the axle, and a foot lever mounted on the axle adjacent to the seat of a slotted bar arranged under and bolted to the rear ends of the thills, a series of U-shaped hoes arranged under the bar, bolts passed through the ends of the hoes, adjusting rods passed through the slots of the bar and provided above and below the same with nuts, inclined suspension rods terminating at their lower ends in eyes engaging the bolts and at their front ends in hooks engaging the perforations of the bar, and a chain between the rear bar and the foot lever, substantially as specified.

5. In a machine of the class described, the thills 5 and the transverse beam 6 secured to the ends thereof and provided with slots, the U-shaped hoes 10, and front and rear suspension rods 12 and 13 for the hoes, the rear rods 13 being adjustably fitted in the slots of the beam 6, and the front rods loosely connected to a cross bar of the thills, substantially as specified.

In testimony that I claim the foregoing as my own I have hereto affixed my signature in the presence of two witnesses.

WILLIAM H. J. GOODWIN.

Witnesses:
 ANDREW LYME,
 JOS. B. BATCHELOR.